(12) United States Patent
Deng et al.

(10) Patent No.: US 11,863,342 B2
(45) Date of Patent: Jan. 2, 2024

(54) CONTROL METHOD FOR HOME SYSTEM

(71) Applicants: QINGDAO HAIER WASHING MACHINE CO., LTD., Qingdao (CN); Haier Smart Home Co., Ltd., Qingdao (CN)

(72) Inventors: Jinzhu Deng, Qingdao (CN); Sheng Xu, Qingdao (CN); Peishi Lv, Qingdao (CN); Hai Shu, Qingdao (CN)

(73) Assignees: QINGDAO HAIER WASHING MACHINE CO., LTD., Qingdao (CN); Haier Smart Home Co., Ltd., Qingdao (CN)

( * ) Notice: Subject to any disclaimer, the term of this patent is extended or adjusted under 35 U.S.C. 154(b) by 273 days.

(21) Appl. No.: 17/432,655

(22) PCT Filed: Feb. 5, 2020

(86) PCT No.: PCT/CN2020/074349
§ 371 (c)(1),
(2) Date: Aug. 20, 2021

(87) PCT Pub. No.: WO2020/168912
PCT Pub. Date: Aug. 27, 2020

(65) Prior Publication Data
US 2022/0166642 A1    May 26, 2022

(30) Foreign Application Priority Data
Feb. 20, 2019   (CN) .......................... 201910127146.5

(51) Int. Cl.
*H04L 12/28* (2006.01)
*G05B 15/02* (2006.01)
(Continued)

(52) U.S. Cl.
CPC .......... *H04L 12/2821* (2013.01); *G05B 15/02* (2013.01); *H04L 12/12* (2013.01);
(Continued)

(58) Field of Classification Search
CPC ................ H04L 12/2821; G05B 15/02; G05B 2219/2639; G05B 2219/2642; Y04S 20/222; Y04S 20/242
(Continued)

(56) References Cited

U.S. PATENT DOCUMENTS

2010/0194524 A1* 8/2010 Campero ............ H04L 12/2829
340/3.1
2012/0029711 A1* 2/2012 Besore .................. G01D 4/004
700/287
(Continued)

FOREIGN PATENT DOCUMENTS

CN    101916093 A    12/2010
CN    102063102 A    5/2011
(Continued)

OTHER PUBLICATIONS

International Search Report dated Apr. 28, 2020 in corresponding International application No. PCT/CN2020/074349; 6 pages.

*Primary Examiner* — Meng Vang
(74) *Attorney, Agent, or Firm* — Maier & Maier, PLLC

(57) ABSTRACT

A control method for a home system includes obtaining the power curve of a household appliance to be run; obtaining power curves of all the currently running household appliances; and, if the power curve of the household appliance to be run and that of at least one currently running household appliance meet an off-peak running condition, making the household appliance to be run and the currently running household appliance run within an off-peak period of time. Without affecting the running states of all the currently (Continued)

running household appliances, the method can connect the household appliance to be run to a circuit, meets the demand of a user for making the household appliance to be run and the currently running household appliances simultaneously work, and does not exceed the load of the circuit, thereby improving the overall working efficiency of the home system.

10 Claims, 4 Drawing Sheets

(51) Int. Cl.
 *H04L 12/12* (2006.01)
 *H04L 12/40* (2006.01)
(52) U.S. Cl.
 CPC ............. *H04L 12/40039* (2013.01); *G05B 2219/2639* (2013.01); *G05B 2219/2642* (2013.01); *Y04S 20/222* (2013.01); *Y04S 20/242* (2013.01)

(58) Field of Classification Search
 USPC .......................................................... 709/223
 See application file for complete search history.

(56) References Cited

U.S. PATENT DOCUMENTS

| | | | | |
|---|---|---|---|---|
| 2012/0053741 | A1* | 3/2012 | Beyerle | G05F 5/00 700/291 |
| 2015/0358177 | A1* | 12/2015 | Lee | G05B 19/042 709/217 |
| 2016/0370814 | A1* | 12/2016 | Hanley | H02J 3/003 |
| 2020/0014210 | A1* | 1/2020 | Arnold | G05B 6/02 |

FOREIGN PATENT DOCUMENTS

| | | | |
|---|---|---|---|
| CN | 202339499 U | 7/2012 | |
| CN | 104181898 A | 12/2014 | |
| CN | 106451766 A | 2/2017 | |
| CN | 206002597 U | 3/2017 | |
| DE | 10 2012 107 788 B4 | 5/2015 | |
| WO | WO-2007092503 A2 * | 8/2007 | ......... H02J 13/0062 |
| WO | 2016/067438 A1 | 5/2016 | |

* cited by examiner

CONTROL METHOD FOR HOME SYSTEM

FIELD

The application belongs to the field of home systems, in particular to a control method for a home system.

BACKGROUND

Along with the improvement of people's living standards, the household appliances in users' families are richer and richer in variety. A plurality of different household appliances such as clothes treatment household appliances (such as washing machines, shoe washing machines, smart wardrobes, ironing machines, and the like), environmental conditioning household appliances (air conditioners, humidifiers, air purifiers, and the like), leisure and entertainment household appliances (such as televisions, projectors, sound equipment, and the like) and the like can be arranged in many users' homes. In daily life, since the usage demands for the household appliances of the user are flexible and changeable, the number, the running state, and the type of the household appliances which need to run at the same time in each time period in users' homes can be changed at variable intervals such that the user needs to estimate whether a plurality of household appliances currently running is reasonably run at the same time and whether the running state of each household appliance needs to be changed each time the household appliance is started, thereby lowering the usage experience of the user.

At present, the above problems can be solved by adding all household appliances in a user's home to a smart home system. However, when the number of household appliances running in the same time period in a users' home is large, if the user needs to start a certain household appliance additionally, the total load capacity of the circuit in the home may be exceeded. In this case, an existing home system will connect a household appliance that a user wants to run by automatically disconnecting power to at least one currently running household appliance. The defects of the manner are as follows: although newly started household appliances are connected in the case of the allowance of a circuit environment, at least one currently running household appliance is separated from a working state, making it difficult to meet the demand of running a plurality of household appliances in the same time period by a user.

Accordingly, there is a need in the art for a new control method for a home system to solve the above-mentioned problems.

SUMMARY

In order to solve the problems in the prior art, namely, to solve the problem that the existing home system is difficult to meet the demand of running a plurality of household appliances in the same time period, the application provides a control method for a home system, including: obtaining the power curve of a household appliance to be run; obtaining the power curves of all the currently running household appliances; and if the power curve of the household appliance to be run and that of at least one currently running household appliance meet an off-peak running condition, making the household appliance to be run and the currently running household appliance run within an off-peak period of time.

In the preferred technical solution of the control method, the control method further includes: if the power curve of the household appliance to be run and the power curve of any one of the currently running household appliances do not meet the off-peak running condition, obtaining a priority sequence of all the currently running household appliances and a priority of the household appliance to be run; and selectively adjusting a running state of the currently running household appliance according to the priority sequence of all currently running household appliances and the priority of the household appliance to be run.

In the preferred technical solution of the control method, the step of "selectively adjusting the running state of the currently running household appliance according to the priority sequence of all currently running household appliances and the priority of the household appliance to be run" includes: determining the position of the priority of the household appliance to be run in a priority sequence; and selectively adjusting the running state of the currently running household appliance according to the position of the priority of the household appliance to be run in the priority sequence.

In the preferred technical solution of the control method, the step of "selectively adjusting the running state of the currently running household appliance according to the position of the priority of the household appliance to be run in the priority sequence" includes: when the priority of the household appliance to be run is at the highest level, adjusting the running state of the currently running household appliance according to the priority sequence.

In the preferred technical solution of the control method, the control method further includes, at the same time as or after the step of "adjusting the running state of the currently running household appliance according to the priority sequence": obtaining a current power margin; obtaining a maximum power of the household appliance to be run; comparing the current power margin with the maximum power; and if the current power margin is greater than the maximum power of the household appliance to be run, making the household appliance to be run run.

In the preferred technical solution of the control method, the step of "selectively adjusting the running state of the currently running household appliance according to the position of the priority of the household appliance to be run in the priority sequence" includes: when the priority of the household appliance to be run is at a middle level, adjusting the running state of the currently running household appliance with the priority lower than that of the household appliance to be run according to the priority sequence.

In the preferred technical solution of the control method, the control method further includes, at the same time as or after the step of "adjusting the running state of the currently running household appliance with a priority lower than that of the household appliance to be run according to the priority sequence": obtaining a current power margin; obtaining a maximum power of the household appliance to be run; comparing the current power margin with the maximum power; and if the current power margin is greater than the maximum power of the household appliance to be run, making the household appliance to be run run.

In the preferred technical solution of the control method, the step of "selectively adjusting the running state of the currently running household appliance according to the position of the priority of the household appliance to be run in the priority sequence" includes: when the priority of the household appliance to be run is at the lowest level, not adjusting the running states of all the currently running household appliances.

In the preferred technical solution of the control method, the control method further includes, at the same time as or after the step of "not adjusting the running states of all the currently running household appliances": judging whether the household appliance to be run needs to run in a low power mode; if the household appliance to be run needs to run in the low power mode, making the household appliance to be run run in the low power mode; and if the household appliance to be run doesn't need to run in the low power mode, prohibiting the household appliance to be run from running.

In the preferred technical solution of the control method, the step of "making the household appliance to be run run in the low power mode" includes: obtaining a current power margin; obtaining the minimum power of the household appliance to be run; comparing the current power margin with the minimum power; and if the current power margin is greater than the minimum power, making the household appliance to be run run in the low power mode.

It can be understood by a person skilled in the art that in the control method of the present application, when a user needs to make the household appliance to be run work, the user can firstly judge whether the power curve of the household appliance to be run and the power curve of at least one currently running household appliance meet the off-peak running condition. In the case where the power curves of the household appliance to be run and the currently running household appliance meet the off-peak running condition, the household appliance to be run and the currently running household appliance are made to run within an off-peak period of time so that the household appliance to be run is connected to the circuit on the premise that the running states of all the currently running household appliances are not influenced. The application not only meets the demand of a user that the household appliance to be run and the currently running household appliance work simultaneously, but also does not exceed the load of the circuit, thereby improving the overall working efficiency of the home system on the basis of ensuring the safe use of electricity, and greatly improving the user experience.

Further, in the case where respective power curves of the household appliance to be run and the currently running household appliance do not meet off-peak running, the priority sequence of all the currently running household appliances and the priority of the household appliance to be run are obtained. Therefore, the running state of the currently running household appliance is selectively adjusted according to the running sequence expected by the user, so that the household appliance to be run can be connected to the circuit. Through the implementation mode, the household appliance which the user needs more to run can be in a normal working state so that the influence on the working state of the currently running household appliance which the user wants to run because the household appliance to be run is added into the running queue is avoided, and the number of the household appliances which can work is ensured to the maximum extent under the condition of the demand and willingness of the user.

Further, after obtaining the priority of the household appliance to be run, the running states of some of or all of the currently running household appliances can be selectively adjusted according to the position of the household appliance to be run in the priority sequence of all the currently running household appliances so as to compare the priorities of the household appliance to be run and all the household appliances currently running, thereby determining the running necessity of the household appliance to be run. Further, the household appliance with an adjustable running state in the currently running household appliances is determined, so that the household appliances which can be finally in the running queue are all household appliances that are more expected to run by a user.

Further, in the case where the running state of the household appliance is selectively adjusted according to the priority sequence, the household appliance to be run is selectively allowed to run through the comparison result of the current power margin and the maximum power of the household appliance to be run, so that it is ensured that the total load capacity limited by the circuit will not be exceeded even if the household appliance to be run is added into the running queue, and the safe use of electricity is ensured.

DETAILED DESCRIPTION

Preferred implementation modes of the present application will now be described with reference to the accompanying drawings. It should be understood by those skilled in the art that these implementation modes are merely illustrative of the technical principles of the present application and are not intended to limit the scope of the present application.

It is to be noted that in the description of the present application, although each step of the control method of the present application is described in the present application in a particular sequence, these sequences are not limiting and those skilled in the art can perform the steps in a different sequence without departing from the basic principles of the present application.

On the basis of the problem that the existing home system is difficult to meet the demand of running a plurality of household appliances in the same time period, the application provides a control method for a home system, which aims to ensure the number of the household appliances in a working state in the same time period to the maximum extent on the premise of the safe use of electricity so as to meet the demand of simultaneously using the plurality of household appliances by a user.

Figure 1:
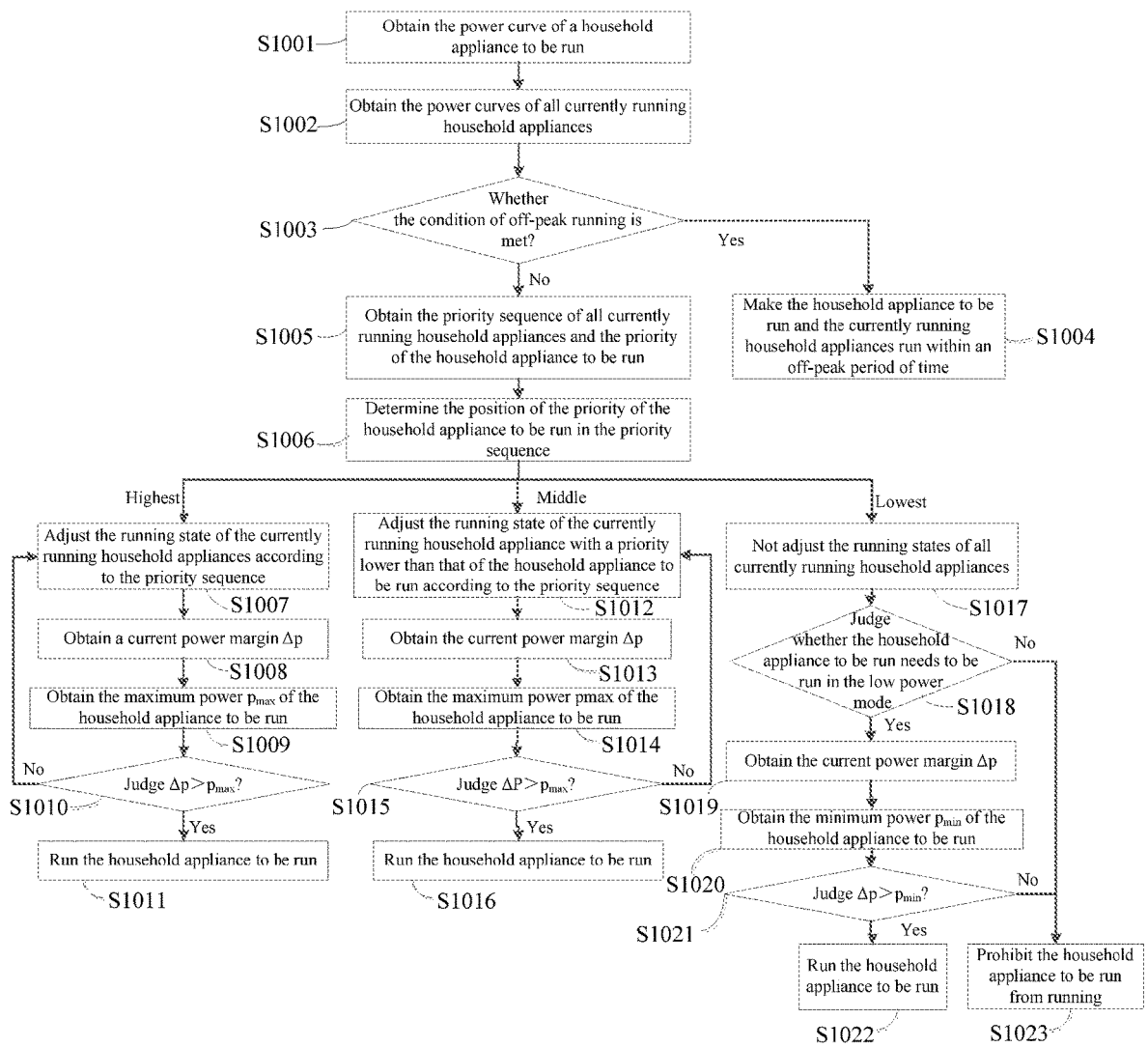
FIG. 1 is a flow chart of the main steps of a control method of the present application.

As shown in FIG. 1, the control method for a home system of the application includes:

step S1: obtaining the power curve of a household appliance to be run;

step S2: obtaining the power curves of all currently running household appliances;

and step S3: if the power curve of the household appliance to be run and that of at least one currently running household appliance meet an off-peak running condition, making the household appliance to be run and the currently running household appliance run within an off-peak period of time.

In the above steps, the "power curve" of the household appliance to be run or the currently running household appliance specifically refers to the fact that: in the whole running program that the household appliance to be run/the currently running household appliance is going to execute or is executing, the running program includes a plurality of stages of working conditions; when the household appliance to be run/the currently running household appliance is in the working conditions of different stages, the real-time power of the household appliance is different, and the curve formed by the real-time power of different working conditions of all stages is the power curve. For example, when the household appliance is clothes treatment equipment, the overall running program of the equipment includes a washing working condition-a dewatering working condition-a rinsing working condition-a dewatering working condition-a drying working condition, and the real-time power corresponding to each working condition is $P_1$-$P_2$-$P_3$-$P_4$-$P_5$, the power of at least part of $P_1$, $P_2$, $P_3$, $P_4$ and $P_5$ being different. In this case, the real-time power during the overall running procedure can form one fluctuating power curve.

In the case that the power curves of the household appliance to be run and all the currently running household appliances are obtained, the specific manner for judging whether the household appliance to be run and the currently running household appliances meet the off-peak running condition can be as follows: in the case where the power curve of the household appliance to be run and the power curve of the currently running household appliance have fluctuations—i.e. the two power curves have peaks and troughs, it is judged whether the peaks (i.e. the high power section) and troughs (i.e. the low power section) of the two power curves meet the interleaving condition of "one running with high power (or low power), and the other one running with low power (or high power)". All the high power sections of the two power curves must be strictly interleaved, that is to say, the case that the household appliance to be run and the currently running household appliance are simultaneously running with high power working condition at a certain moment cannot occur, but the case that the household appliance to be run and the currently running household appliance are simultaneously running with low power working condition at a certain moment can occur. Of course, in the off-peak running procedure, the total power of all the currently running household appliances and the household appliances to be run always does not exceed the total rated power defined by the circuit, and the basic premise of the off-peak running is that after the household appliance to be run is connected into the circuit, the case that the circuit is overloaded always does not occur in the whole running procedure.

The conditions of the above-mentioned off-peak running are exemplified below with reference to one household appliance to be run and one currently running household appliance.

Figure 2:
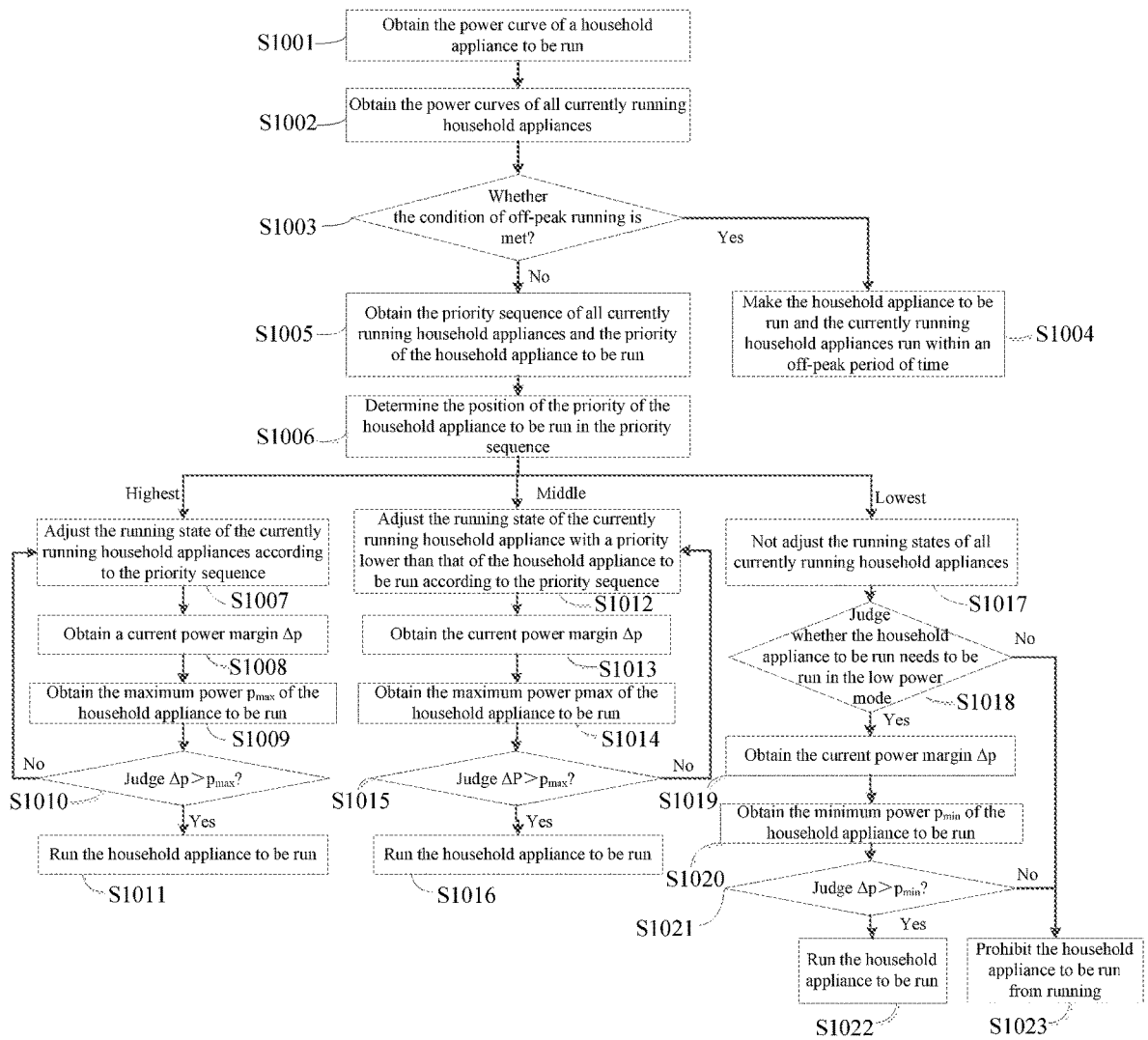
FIG. 2 is a graph of a power curve for the off-peak running of a household appliance to be run and a currently running household appliance in a first case.

As shown in FIG. 2, each of the whole running procedures of the household appliance to be run and the currently running household appliances includes two working conditions, and the powers under the two working conditions are different in magnitude. The working condition of the currently running household appliance in the first stage is a low power working condition and the duration is T1, the working condition in the second stage is a high power working condition and the duration is T2, the working condition of the household appliance to be run in the first stage is high power working condition and the duration is t1, and the working condition in the second stage is a low power working condition and the duration is t2. After the currently running household appliance runs for Δt time, the household appliance to be run is intended to be connected into a circuit to run simultaneously with the currently running household appliance.

In this case, if it is desired to make the household appliance to be run and the currently running household appliance run within an off-peak period of time, the high power section of the household appliance to be run (i.e. t1 section) is strictly staggered from the high power section (i.e. T2 section) of the currently running appliance, i.e. if it is desired to connect the household appliance to be run into the circuit after the currently running household appliance runs for Δttime, the duration of the t1 section of the household appliance to be run cannot exceed the remaining duration (i.e., T1-Δt) of the T1 section of the currently running household appliance. Of course, since the case where the household appliance to be run and the currently running household appliance run at a low power working condition at the same time, or the currently running household appliance ends the running program, only leaving the household appliance to be run running at a low power working condition will not cause a circuit overloading, in practice, the duration of the low power section (i.e., t2 section) of the household appliance to be run can be greater than the duration of the T2 section of the currently running household appliance. In the case where the household appliance to be run and the currently running household appliance are run strictly within an off-peak period of time, the duration of the t1 section is equal to T1-Δt, and the duration of the t2 section is equal to that of the T2 section.

Figure 3:
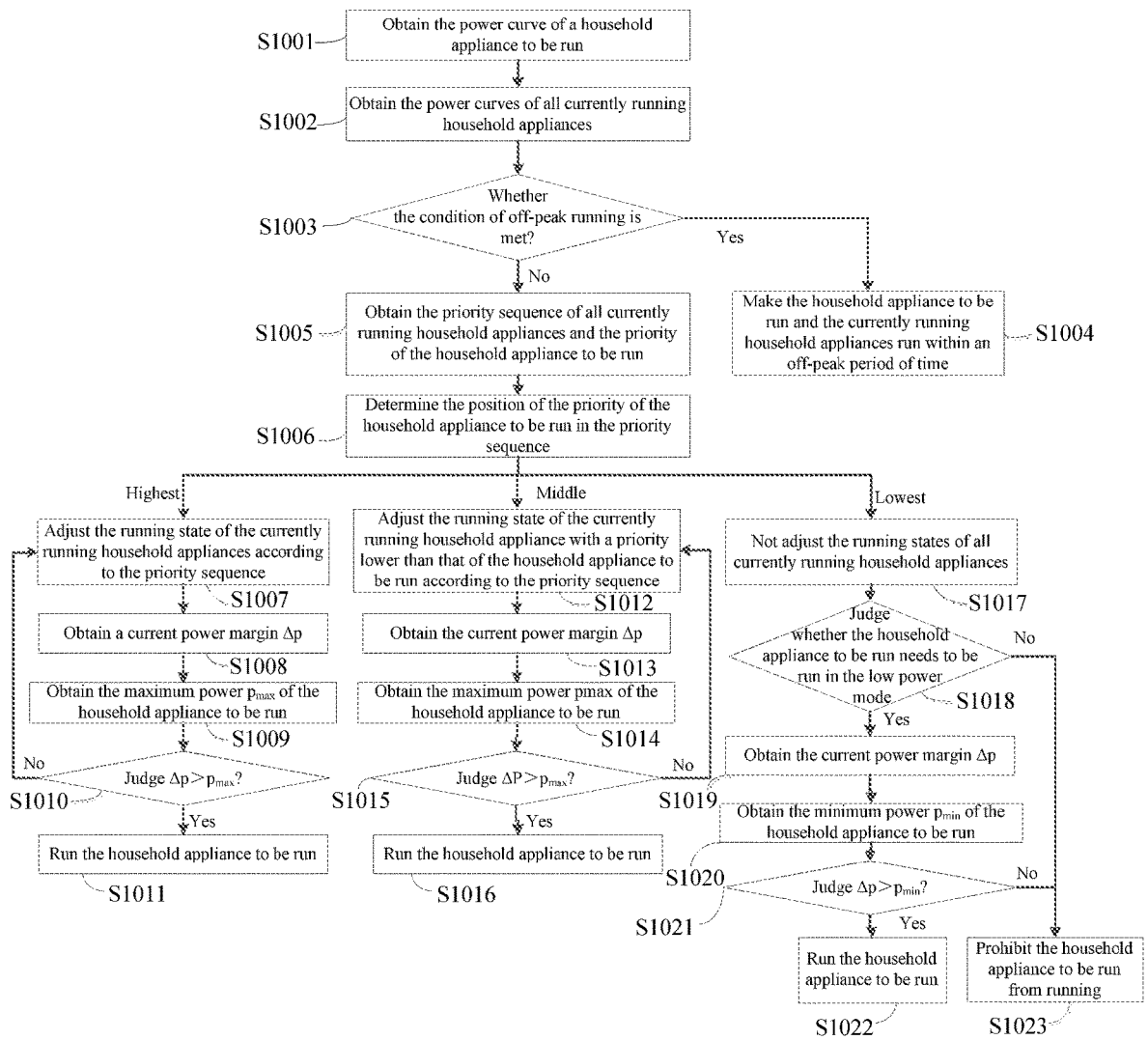
FIG. 3 is a graph of a power curve for the off-peak running of a household appliance to be run and a currently running household appliance in a second case.

As shown in FIG. 3, when the power curves of the currently running household appliance and the household appliance to be run are opposite to the power curves shown in FIG. 2, that is, when the working condition of the currently running household appliance in the first stage is a high power working condition and the duration is T1, the working condition in the second stage is a low power working condition and the duration is T2, the working condition of the household appliance to be run in the first stage is a low power working condition and the duration is t1, and the working condition in the second stage is a high power working condition and the time duration is t2, if the household appliance to be run is connected into the circuit after the currently running household appliance runs for Δt time to run simultaneously with the currently running household appliance, the high power section (i.e., t2 section) of the household appliance to be run and the high power section (i.e., T1 section) of the currently running household appliance still need to be strictly staggered.

In this case, if it is desired to connect the household appliance to be run into the circuit after the currently running household appliance runs for Δt time, the duration of the t1 section of the household appliance to be run must not be less than the remaining running duration (i.e., T1-Δt) of the currently running household appliance. In the second stage, when the household appliance to be run runs at a high power working condition, and the currently running household appliance runs at a low power working condition, the load condition of the circuit can be met so that obviously the circuit overloading case will not be caused even if the ending time of the household appliance to be run is after that of the currently running household appliance.

It will be appreciated by a person skilled in the art that although both the above-mentioned cases are described in connection with the case where only one currently running household appliance is connected to the circuit, and the power curves of the currently running household appliance and the household appliance to be run respectively include two stages, this is merely for the purpose of illustrating the off-peak running conditions of the present application as examples and should not constitute any limitation to the protection of the present application. Without departing from the basic principles of the present application, the running environment of the circuit and the power curve of each household appliance may not be limited to the above-mentioned cases. For example, under the condition that the power curves of a plurality (e.g., two) of currently running household appliances fluctuate similarly and the plurality of power curves and the power curves of the household appliances to be run meet off-peak running, the household appliance to be run can also run within an off-peak period of time with the plurality of currently running household appliances, i.e., the household appliance to be run runs in a high power mode, and the plurality of the currently running household appliances runs in a low power mode. When the power curves of the household appliance to be run and the currently running household appliance both include a plurality of peaks and troughs, the duration of each peak and trough need to be compared so as to judge whether each high power section of the household appliance to be run is strictly staggered with each high power section of the currently running household appliance, and further judge whether the power curve of the household appliance to be run and the power curve of the currently running household appliance meet the conditions of off-peak running. In summary, in the case that the currently running household appliance is connected to the main circuit, if the overloading situation of the main circuit occurs when the maximum power of a program required to be run by the household appliance to be run is substituted into the current circuit environment of the main circuit, when the household appliance to be run and the currently running household appliance can run within an off-peak period of time, it means that the stage of the maximum power of the household appliance to be run will coincide with the stage of low power of the currently running household appliance. Therefore, when the household appliance to be run runs at high power, the currently running household appliance running at low power can make the household appliance to be run be in one circuit environment with a large power margin (i.e. the remaining capacity in the main circuit), so that the household appliance to be run can be connected into the circuit to run without causing circuit overloading.

Preferably, the control method of the present application further includes:
  if the power curve of the household appliance to be run and the power curve of any one of the currently running household appliances do not meet the off-peak running condition, obtaining the priority sequence of all currently running household appliances and the priority of the household appliance to be run;
  and selectively adjusting the running state of the currently running household appliance according to the priority sequence of all currently running household appliances and the priority of the household appliance to be run.

In the above steps, the setting manner of the priority sequence of the currently running household appliances and the running priority of the household appliances to be run is not unique. For example, the running priority of all household appliances can be set in advance by a user. For example, the running priority of each household appliance (or the priority sequence of a plurality of household appliances) is directly set and then uploaded to a cloud server or a control center of a home system; it is also possible that the household appliance is given the running priority before each running.

Preferably, the home system of the present application further includes a smart plug capable of connecting a plurality of household appliances to a circuit, the smart plug having a plurality of sockets with different priorities, and each socket being capable of connecting to and supplying power to one household appliance. In the case where the socket supplies power to the household appliance, the priority of the socket is the running priority of the household appliance inserted into the socket. Since the priorities of the sockets to which each household appliance is connected are different, corresponding to the priorities of the sockets specifically corresponding to each household appliance, a plurality of household appliances can be sorted according to the priority of the socket to which they are connected, that is, the priorities of the sockets determine the priorities of the currently running household appliances linked to each socket, so that all the currently running household appliances have running priority sequence. The running priority of the household appliance to be run is the priority of the socket that supplies power thereto (the case where the same priority socket exists is not considered here). Further, the one-to-one correspondence between the sequence of priorities and each currently running household appliance is changeable. The user may adjust the priority sequence by adjusting the correspondence between the sockets and priorities thereof. For example, the user can adjust the priority sequence by changing the socket positions connected by the household appliances; alternatively, the user may change the priority sequence by directly changing the priority of each socket. For example, setting a socket with a high priority to the socket with a high priority, setting a socket with a low priority to the socket with a medium priority, and setting a socket with a medium priority to the socket with a low priority. The priority sequence can be adjusted in a manner of either equipment/program setting or manual setting.

More preferably, the step of "selectively adjusting the running state of the currently running household appliance according to the priority sequence of all currently running household appliances and the priority of the household appliance to be run" specifically includes:
  determining the position of the priority of the household appliance to be run in the priority sequence of all the currently running household appliances;
  and selectively adjusting the running state of the currently running household appliance according to the position of the priority of the household appliance to be run in the priority sequence of all the currently running household appliances.

By comparing the priority of the household appliance to be run with each priority in the priority sequence of all the currently running household appliances, the high-low relationship between the priority of the household appliance to be run and the priorities of the other currently running household appliances can be gained, so that the running state of which currently running household appliance is adjusted is determined according to the priority of the household appliances to be run and all the currently running household appliances. Therefore, by selectively adjusting the running states of the currently running household appliances, the circuit environment of the main circuit is changed and the household appliance to be run is connected as much as possible.

In one possible implementation mode, the step of "selectively adjusting the running state of the currently running household appliances according to the position of the priority of the household appliance to be run in the priority sequence" includes:

when the priority of the household appliance to be run is at the highest level, adjusting the running state of the currently running household appliance according to the priority sequence. In the above steps, since the priorities of all the currently running household appliances are lower than that of the household appliance to be run, all the currently running household appliances belong to adjustable objects. "Adjusting the running state of the currently running household appliances according to the priority sequence" specifically refers to the case that when the running state of the currently running household appliance is adjusted, the currently running household appliance with low priority is preferentially adjusted. If the circuit environment after the currently running household appliance with low priority is adjusted does not meet the connecting demand of the household appliance to be run, the currently running household appliance with the next lowest priority level is continuously adjusted until the currently running household appliance with the highest priority is adjusted. As an example, the manners for adjusting the currently running household appliance includes at least one of "enabling the currently running household appliance to run in a low mode with a small occupied power", "enabling the currently running household appliance to suspend running a program", "enabling the currently running household appliance to end running a program and be in a standby state", and "enabling the currently running household appliance to be in an off/to be awakened state". When the adjustment manners are plural, the execution sequence of the plurality of adjustment manners can be set according to usage habits, usage demand, and the like of users. For example, the execution sequence is: switch low power mode>suspend running>standby>off/to be awakened. Of course, the adjustment manner specifically adopted is not limited to the above four types, so long as the power occupation of the main circuit can be reduced on the premise of meeting the usage demand of users.

Furthermore, the control method of the present application further includes, at the same time as or after the step of "adjusting the running state of the currently running household appliance according to the priority sequence":

obtaining a current power margin;
obtaining a maximum power of the household appliance to be run;
comparing the current power margin with the maximum power;
and if the current power margin is greater than the maximum power, making the household appliance to be run run.

The above-mentioned "current power margin" refers to the power margin in the main circuit after the running state of the currently running household appliance is adjusted (equivalent to the remaining loading capacity which can be borne by the main circuit after the running state of the currently running household appliance is adjusted). Specifically, after the running state of the household appliance with the lowest priority is adjusted, the power margin in the main circuit at the moment can be obtained, and whether the household appliance to be run can be connected to the circuit or not can be judged through the above-mentioned steps. If so, connecting the household appliance to be run to the circuit to start running, otherwise, adjusting the household appliance with the next lowest priority and repeating the judgment procedure. Of course, although the embodiment is described in connection with adjusting only one currently running household appliance each time, in practice, the number of currently running household appliances adjusted each time is not defined. For example, the currently running household appliances with the lowest priority and next lowest priority can be adjusted at the same time, and if the connecting condition is not met, the currently running household appliances with middle priority and high priority are adjusted.

In another possible implementation mode, the step of "selectively adjusting the running state of the currently running household appliance according to the position of the priority of the household appliance to be run in the priority sequence" includes:

when the priority of the household appliance to be run is at the middle level, adjusting the running state of the currently running household appliance with a priority lower than that of the household appliance to be run according to the priority sequence.

In the above-mentioned steps, since the priorities of some of all the currently running household appliances are higher than the priority of the household appliance to be run, and the priorities of the others of the household appliances are lower than the priority of the household appliance to be run, in this case, the object with the adjustable running state is the currently running household appliance with a priority lower than that of the household appliances to be run.

Likewise, the control method of the present application further includes, at the same time as or after the step of "adjusting the running state of the currently running household appliance with a priority lower than that of the household appliance to be run according to the priority sequence":

obtaining a current power margin;
obtaining a maximum power of the household appliance to be run;
comparing the current power margin with the maximum power;
and if the current power margin is greater than the maximum power, making the household appliance to be run run.

Since the judging procedure has been described in the foregoing, it will not be described in detail herein.

In yet another possible implementation mode, the step of "selectively adjusting the running state of the currently running household appliance according to the position of the priority of the household appliance to be run in the priority sequence" includes:

when the priority of the household appliance to be run is at the lowest level, not adjusting the running states of all the currently running household appliances.

In the above steps, since the priorities of all the currently running household appliances are higher than the priority of the household appliance to be run, in this situation, there is no object whose running state is adjustable among all the currently running household appliances.

Preferably, the control method of the present application further includes, at the same time as or after the step of "not adjusting the running states of all currently running household appliances":

determining whether the household appliance to be run needs to run in a low power mode;
if the household appliance to be run needs to run in the low power mode, making the household appliance to be run run in the low power mode;
and if the household appliance to be run doesn't need to run in the low power mode, prohibiting the household appliance to be run from running.

That is to say, in the case where the running states of all the currently running household appliances are not adjustable, the to-be-run state of the household appliance to be run can be changed on the premise of meeting the usage demand of the user so that the household appliance to be run can be connected to the main circuit in a running mode with small occupied power. Of course, when the household appliance to be run only has one running mode or does not have a running mode that has a lower occupied power than that of the to-be-run mode, the steps are not executed. In the case where the running states of all the currently running household appliances are not adjustable, the running of the household appliance to be run is directly prohibited.

Further, the step of "making the household appliance to be run run in the low power mode" includes:
  obtaining a current power margin;
  obtaining a minimum power of the household appliance to be run;
  comparing the current power margin with the minimum power;
  and if the current power margin is greater than the minimum power, making the household appliance to be run run in the low power mode.

In the above-mentioned procedure, the "current power margin" refers to the power margin in the main circuit when the running states of all the currently running household appliances are not adjusted. "Minimum power" refers to the maximum power occupied in the main circuit by the household appliance to be run in the low power mode. In the case where the current power margin is greater than the minimum power, the remaining power in the main circuit can allow the household appliance to be run to be connected so that the household appliance to be run can be electrified at the moment and run in the low power mode.

Since the above-mentioned three implementation modes are described separately in connection with one type of priority position, the control method of the present application, in practical applications, may include at least one running procedure of the above-mentioned three implementation modes. Preferably, the control method of the present application includes the running steps in the above-mentioned three cases at the same time so as to accurately judge whether the household appliance to be run can be connected to the circuit in terms of a plurality of possible connecting positions of the household appliance to be run.

Figure 4:
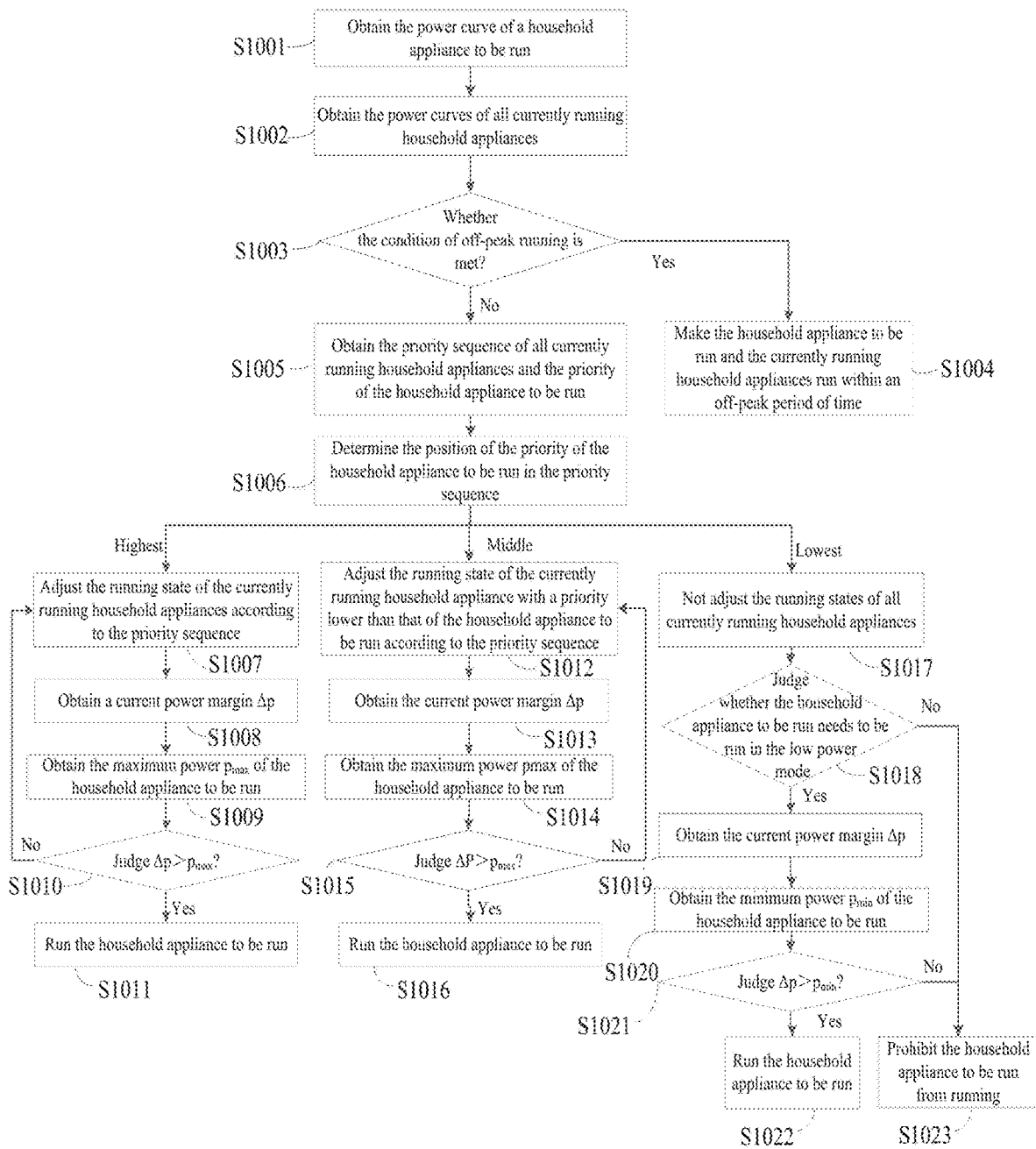
FIG. 4 is a flow chart of detailed steps of a preferred implementation mode of the control method of the present application.

As shown in FIG. 4, the detailed steps of the preferred implementation mode of the control method of the present application include:
  step S1001: obtaining the power curve of a household appliance to be run;
  step S1002: obtaining the power curves of all currently running household appliances;
  step S1003: judging whether the power curve of the household appliance to be run and that of at least one currently running household appliance meet an off-peak running condition,
  if the power curve of the household appliance to be run and that of at least one currently running household appliance meet the off-peak running condition, executing step S1004, and otherwise, executing step S1005;
  step S1004: making the household applicant to be run and the currently running household appliance run within an off-peak period of time;
  step S1005: obtaining the priority sequence of all the currently running household appliances and the priority of the household appliance to be run;
  step S1006: determining the position of the priority of the household appliance to be run in the priority sequence;
  if the priority of the household appliance to be run is at the highest level, executing step S1007; if the priority of the household appliance to be run is at the middle level, executing step S1012; and if the priority of the household appliance to be run is at the lowest level, executing step S1017;
  in the case where the priority of the household appliance to be run is at the highest level:
  step S1007: adjusting the current running state according to the priority sequence and executing step S1008;
  step S1008: obtaining a current power margin $\Delta p$ in an adjusted main circuit;
  step S1009: obtaining the maximum power $p_{max}$ of the household appliance to be run;
  step S1010: judging whether the current power margin $\Delta p$ is greater than the maximum power $p_{max}$, and if the current power margin $\Delta p$ is greater than the maximum power $p_{max}$, executing step S1011, and otherwise, returning to step S1007;
  and step S1011: making the household appliance to be run run;
  in the case where the priority of the household appliance to be run is at the middle level:
  step S1012: adjusting the running state of the currently running household appliance with a priority lower than that of the household appliance to be run according to the priority sequence and executing step S1013;
  step S1013: obtaining the current power margin $\Delta p$ in the adjusted main circuit;
  step S1014: obtaining the maximum power $p_{max}$ of the household appliance to be run;
  step S1015: judging whether the current power margin $\Delta p$ is greater than the maximum power $p_{max}$;
  if the current power margin $\Delta p$ is greater than the maximum power $p_{max}$, executing step S1016, and otherwise, returning to step S1012;
  and step S1016: making the household appliance to be run run;
  in the case where the priority of the household appliance to be run is at the lowest level:
  step S1017: not adjusting the running states of all currently running household appliances, and executing step S1018;
  step S1018: judging whether the household appliance to be run needs to run in the low power mode;
  if the household appliance to be run needs to run in the low power mode, executing step S1019, and otherwise, executing step S1023;
  step S1019: obtaining the current power margin $\Delta p$ of the main circuit which is not adjusted;
  step S1020: obtaining the minimum power $p_{min}$ of the household appliance to be run;
  step S1021: judging whether the current power margin $\Delta p$ is greater than the minimum power $p_{min}$, and if the current power margin $\Delta p$ is greater than the minimum power $p_{min}$, executing step S1022, and otherwise, executing step S1023;
  step S1022: making the household appliance to be run run in the low power mode; and step S1023: prohibiting the household appliance to be run from running.

In summary, according to the control method of the present application, the household appliance to be run can be connected into the circuit on the premise of not influencing the running states of all the currently running household appliances. The application not only meets the demand of a user that the household appliance to be run and the currently running household appliance work simultaneously, but also does not exceed the load of the circuit, thereby improving the overall working efficiency of the home system on the basis of ensuring the safe use of electricity, and greatly improving the user experience.

The technical solution of the present application has thus far been described in connection with the preferred implementation modes shown in the accompanying drawings, but it will be readily understood by those skilled in the art that the scope of the present application is obviously not limited to these specific implementation modes. Those skilled in the art can make equivalent alterations or substitutions to the relevant technical features without departing from the principles of the present application, and the technical solution after such alterations or substitutions are intended to fall within the scope of the present application.

What is claimed is:

1. A computer-implemented control method for a home system, comprising:
    obtaining a power curve of a household appliance to be run, wherein the power curve of a household appliance to be run has peaks and troughs;
    obtaining power curves of all currently running household appliances, wherein the power curves of all currently running household appliances have peaks and troughs, respectively;
    judging whether the household appliance to be run and the currently running household appliances meet an off-peak running condition by judging whether each of the peaks of the power curve of the household appliance to be run is interleaved with each of the peaks of each of the power curves of the all currently running household appliances, wherein if each of the peaks of the power curve of the household appliance to be run is interleaved with each of the peaks of each of the power curves of the all currently running household appliances, it is determined that the household appliance to be run and the currently running household appliances meet the off-peak running condition; and
    if the power curve of the household appliance to be run and that of at least one currently running household appliance meet the off-peak running condition, connecting the household appliance to be run into a circuit in which the currently running household appliances run and making the household appliance to be run and the currently running household appliance run within an off-peak period of time.

2. The control method according to claim 1, further comprising:
    if the power curve of the household appliance to be run and a power curve of any one of the currently running household appliances do not meet the off-peak running condition, obtaining a priority sequence of all the currently running household appliances and a priority of the household appliance to be run;
    and selectively adjusting a running state of the currently running household appliance according to the priority sequence of all currently running household appliances and the priority of the household appliance to be run.

3. The control method according to claim 2, wherein the step of selectively adjusting a running state of the currently running household appliance according to the priority sequence of all currently running household appliances and the priority of the household appliance to be run comprises:
    determining a position of the priority of the household appliance to be run in a priority sequence;
    and selectively adjusting the running state of the currently running household appliance according to the position of the priority of the household appliance to be run in the priority sequence.

4. The control method according to claim 3, wherein the step of selectively adjusting the running state of the currently running household appliance according to the position of the priority of the household appliance to be run in the priority sequence of all the currently running household appliances comprises:
    when the priority of the household appliance to be run is at a highest level, adjusting the running state of the currently running household appliance according to the priority sequence.

5. The control method according to claim 4, further comprising, at the same time as or after the step of adjusting the running state of the currently running household appliance according to the priority sequence:
    obtaining a current power margin;
    obtaining a maximum power of the household appliance to be run;
    comparing the current power margin with the maximum power;
    and, if the current power margin is greater than the maximum power, making the household appliance to be run run.

6. The control method according to claim 3, wherein the step of selectively adjusting the running state of the currently running household appliance according to the position of the priority of the household appliance to be run in the priority sequence of all the currently running household appliances comprises:
    when the priority of the household appliance to be run is at a middle level, adjusting the running state of the currently running household appliance with the priority lower than that of the household appliance to be run according to the priority sequence.

7. The control method according to claim 6, further comprising, at the same time as or after the step of adjusting the running state of the currently running household appliance with the priority lower than that of the household appliance to be run according to the priority sequence:
    obtaining a current power margin;
    obtaining a maximum power of the household appliance to be run;
    comparing the current power margin with the maximum power;
    and if the current power margin is greater than the maximum power, making the household appliance to be run run.

8. The control method according to claim 3, wherein the step of selectively adjusting the running state of the currently running household appliance according to the position of the priority of the household appliance to be run in the priority sequence comprises:
    when the priority of the household appliance to be run is at a lowest level, not adjusting the running states of all the currently running household appliances.

9. The control method according to claim 8, further comprising, at the same time as or after the step of not adjusting the running states of all the currently running household appliances:
    judging whether the household appliance to be run needs to run in a low power mode;
    if the household appliance to be run needs to run in the low power mode, making the household appliance to be run run in the low power mode;

and if the household appliance to be run doesn't need to run in the low power mode, prohibiting the household appliance to be run from running.

10. The control method according to claim 8, wherein the step of making the household appliance to be run run in the low power mode comprises:

obtaining a current power margin;

obtaining a minimum power of the household appliance to be run;

comparing the current power margin with the minimum power;

and if the current power margin is greater than the minimum power, making the household appliance to be run run in the low power mode.

\* \* \* \* \*